April 17, 1956 J. O. PREISIG ET AL 2,742,523

FIELD IDENTIFICATION APPARATUS

Filed Nov. 27, 1951 3 Sheets-Sheet 1

INVENTORS
JOSEPH O. PREISIG
& ALLEN A. BARCO
BY [signature]
ATTORNEY

April 17, 1956 J. O. PREISIG ET AL 2,742,523

FIELD IDENTIFICATION APPARATUS

Filed Nov. 27, 1951 3 Sheets-Sheet 2

INVENTORS
JOSEPH O. PREISIG
& ALLEN A. BARCO
BY [signature]
ATTORNEY

INVENTORS
JOSEPH O. PREISIG
& ALLEN A. BARCO
BY
ATTORNEY 2,742,523

FIELD IDENTIFICATION APPARATUS

Joseph O. Preisig, Bronx, N. Y., and Allen A. Barco, Princeton, N. J., assignors to Radio Corporation of America, a corporation of Delaware Application November 27, 1951, Serial No. 258,472

7 Claims. (Cl. 178—5.4)

This invention relates to apparatus adapted to sense whether the odd line or even line field of a television raster is about to be scanned.

In accordance with present television practice, a scene to be televised is scanned along a series of parallel lines during a first field and along a second series of lines that are interleaved with the first series of lines during a second or interlaced field. These alternate fields are sometimes referred to as the odd and even line fields and are separated by a vertical blanking interval during which the beam reverts to a position from which it can start scanning the next field. A color television system has been developed in which the intensity of a plurality of primary colors in a scene are successively analyzed or sampled in repeated sequence as each line of each field is scanned. Much improvement has been brought about in this color system by sampling the primary colors in one sequence during the first field and in a reverse sequence during a second field.

In order that receivers that reproduce colors from their sampled signals may be standardized, the sampling at the transmitter must be controlled so that the primary colors are always sampled in a given sequence during the odd line field and in the reverse sequence during the even line fields. The sampler itself may be comprised of a plurality of modulators provided with alternating current carrier waves of different phases in such manner that each is modulated by the video signal representing a different primary color. If there are two or if there are three primary colors, a reversal in the sampling order can be brought about by interchanging the primary color signals applied to two of the modulators or by interchanging the phases of the alternating current applied to two of the modulators. This interchange of either color signals or carrier waves could for example be effected by a double pole double throw switch that is either mechanical or electronic. Whatever means is employed for actually bringing about the reversal in the color sampling sequence, it is apparent that it must be controlled so that it sets up the proper sequence for a field during the vertical blanking interval preceding it.

One object of this invention is to provide improved means for deriving control voltages that are different from field to field.

The manner in which the above objects may be attained will be clearly understood after a detailed consideration of the drawings in which.

The apparatus about to be described in detail produces a first group of pulses, one of which occurs during a vertical blanking interval, and a second group of pulses, one of which occurs during alternate vertical blanking intervals. Each pulse of the second group follows the pulse of the first group occurring during the same vertical blanking interval. Each of the first group of pulses is applied to a bistable device in such manner as to trigger it to one of its stable conditions and each of the pulses of the second group is applied to the bistable device so as to trigger it to its other stable condition. In accordance with this invention the operation described above is brought about in response to vertical drive pulses and horizontal drive pulses normally available at a television transmitter.

Figures 1, 2:
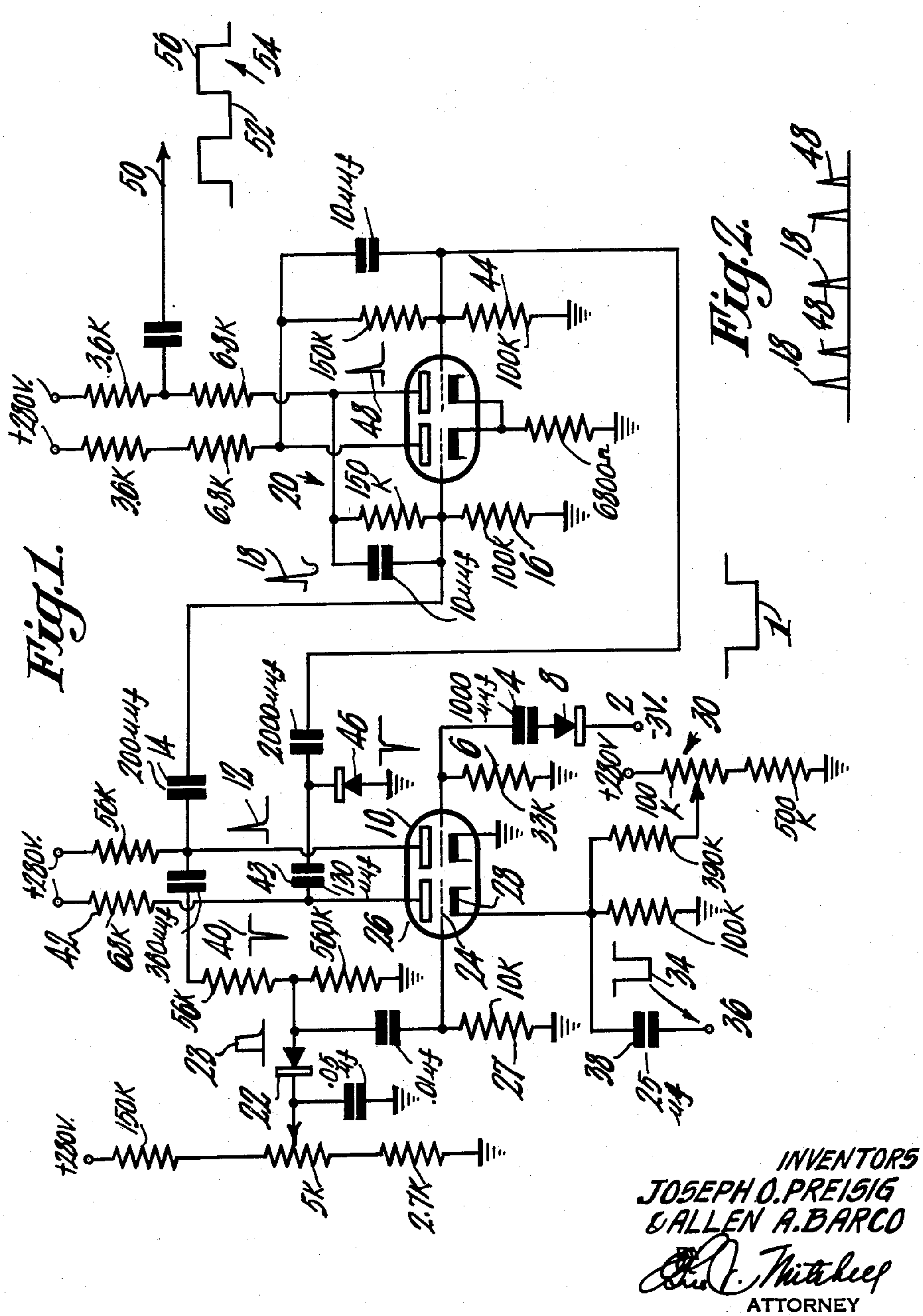
Figure 1 is a schematic diagram of one embodiment of the invention.
Figure 2 is a graph useful in explaining the operation of the apparatus shown in Figure 1.

In the apparatus of Figure 1 the pulses that occur during each blanking interval are derived as follows. A negative vertical drive pulse 1 is applied at an input terminal 2 and is differentiated by the action of a condenser 4 and a resistor 6 connected in series between the terminal and ground. The leading edge of the negative vertical drive pulse 1 produces a negative pip and the trailing edge of the vertical drive pulse produces a positive pip. The positive pip is suppressed by the insertion of a unilateral conductive device 8 that is polarized so as to present a high impedance in the discharge path of the condenser 4. However, the resistance is low enough to discharge the condenser 4 within a field interval. The negative pip therefore is the only one that appears across the resistor 6. After passing through an amplifier 10, the negative pip that appeared across the resistor 6 appears across the plate load of the amplifier 10 as a positive pip 12. The positive pip 12 is differentiated by a condenser 14 and a resistor 16 connected between the plate of the amplifier 10 and ground so as to produce across the resistor 16 the differentiated wave 18. This wave is applied to one side of a bistable multivibrator 20. Inasmuch as the wave 18 is positive and is applied to a grid of one of the tubes in the multivibrator it will tend to make the left hand side of the multivibrator conductive. A pulse 18 occurs during a vertical blanking period and at a time corresponding to the leading edge of the vertical drive pulses.

The following explanation has to do with the manner in which the pulses of the second group that occur during alternate blanking intervals may be derived. The pulse 12 appearing across the load of the amplifier 10 is clipped so as to form a pedestal pulse 23 by the action of a biased unilateral device 22 in a manner that can be well understood by those skilled in the art. The pedestal pulse 23 is applied to the grid 24 of an amplifier 26 in such polarity as to tend to cause it to conduct. The cathode 28 of the amplifier 26 is connected to a source of potential 30 that is sufficiently positive to cut the amplifier 26 off even in the presence of the positive pulses 23 that are applied to its grid. Negative horizontal drive pulses 34 are applied to a terminal 36 and are coupled to the cathode 28 of the amplifier 26 by a condenser 38. Inasmuch as these horizontal drive pulses are negative and are applied to the cathode they also tend to make the amplifier 26 conduct. The bias established on the cathode 28 by the potentiometer 30 is set so that the amplifier 26 only conducts when the horizontal drive pulses 34 coincide with the pedestal pulses 23. When this happens, a pulse 40 appears across the plate load resistor 42 of the amplifier 26. Owing to the rather low frequency response produced by the rather large grid leak resistor 27 attached to the grid 24 and other associated components of the amplifier 26, the current flowing therein is integrated so that the pulse 40 is a somewhat distorted horizontal drive pulse. The pulse 40 is differentiated by the action of a condenser 43 and a resistor 44 so as to produce a negative pulse in response to the leading edge and a positive pulse in response to the trailing edge in a well known manner. A unilateral device 46 is connected between the junction of the resistor 44 and the condenser 43 and ground in such polarity as to conduct the negative pulses produced by differentiating the pulse 40 to ground. Thus the only pulses appearing across the resistor 44 are positive. These pulses are applied to the right hand side of the bistable multivibrator 20 in such manner as to tend to trigger it into conduction. The square wave switching voltages necessary for interchanging the sampling order in a television system of the type described above may be derived from either side of the bistable multivibrator 20. As shown, the switching voltage output lead 50 is connected to the plate circuit of the right hand side of the multivibrator.

The coincidence of the pedestal pulse 23 and the negative horizontal drive pulses 34 occurs on alternate blanking periods. The reason for this is that one of the horizontal drive pulses 34 coincides with the leading edge of the vertical drive pulse of one field but none of them coincide with the leading edge of the vertical drive pulse on the next field. Therefore, the emphasized horizontal pulses 40 substantially coincide with the leading edge of the vertical drive pulses 1.

The general operation of the circuit of Figure 1 will now be described. In order that relationship between the pulses 18 and 48 that are employed to trigger the multivibrator 20 may be better understood, they are illustrated in Figure 2. The pulse 18 occurs during each vertical blanking period, but due to the action of the horizontal drive pulse 34, the pulses 48 are only formed during alternate blanking periods. It will be noted that the pulse 48 follows the corresponding pulse 18. This is because the pulses 18 are produced in coincidence with the leading edge of the vertical drive pulse 1 and the pulses 48 are produced in coincidence with the trailing edge of the horizontal drive pulse 34. This latter trailing edge occurs after the leading edge of the vertical drive pulse 1, and, therefore, the pulse 48 must necessarily follow the pulse 18. Proceeding from left to right, assume that the first pulse 18 triggers the left hand side of the multivibrator 20 into conduction. This will barely have taken place before a following pulse 48, occurring within the same vertical blanking interval, reverses the polarity of the multivibrator and causes the right hand side to conduct. The voltage of the output lead 50 will therefore have a low value as indicated by the numeral 52 in the wave 54. The condition of the multivibrator remains unchanged during the following field until the second pulse 18 arrives at the left hand side of the multivibrator 20, at which time the multivibrator is reversed in polarity and the left hand side becomes conductive. As the right hand side is now non-conducting, the voltage at the output lead 50 increases as indicated by the numeral 56. The third pulse 18 arrives during the next vertical blanking interval, but has no effect on the multivibrator 20 as the left hand side is already conducting to its fullest extent. However, immediately following this third pulse 18 is the second pulse 48 which causes the multivibrator to again reverse its position.

Figure 3:
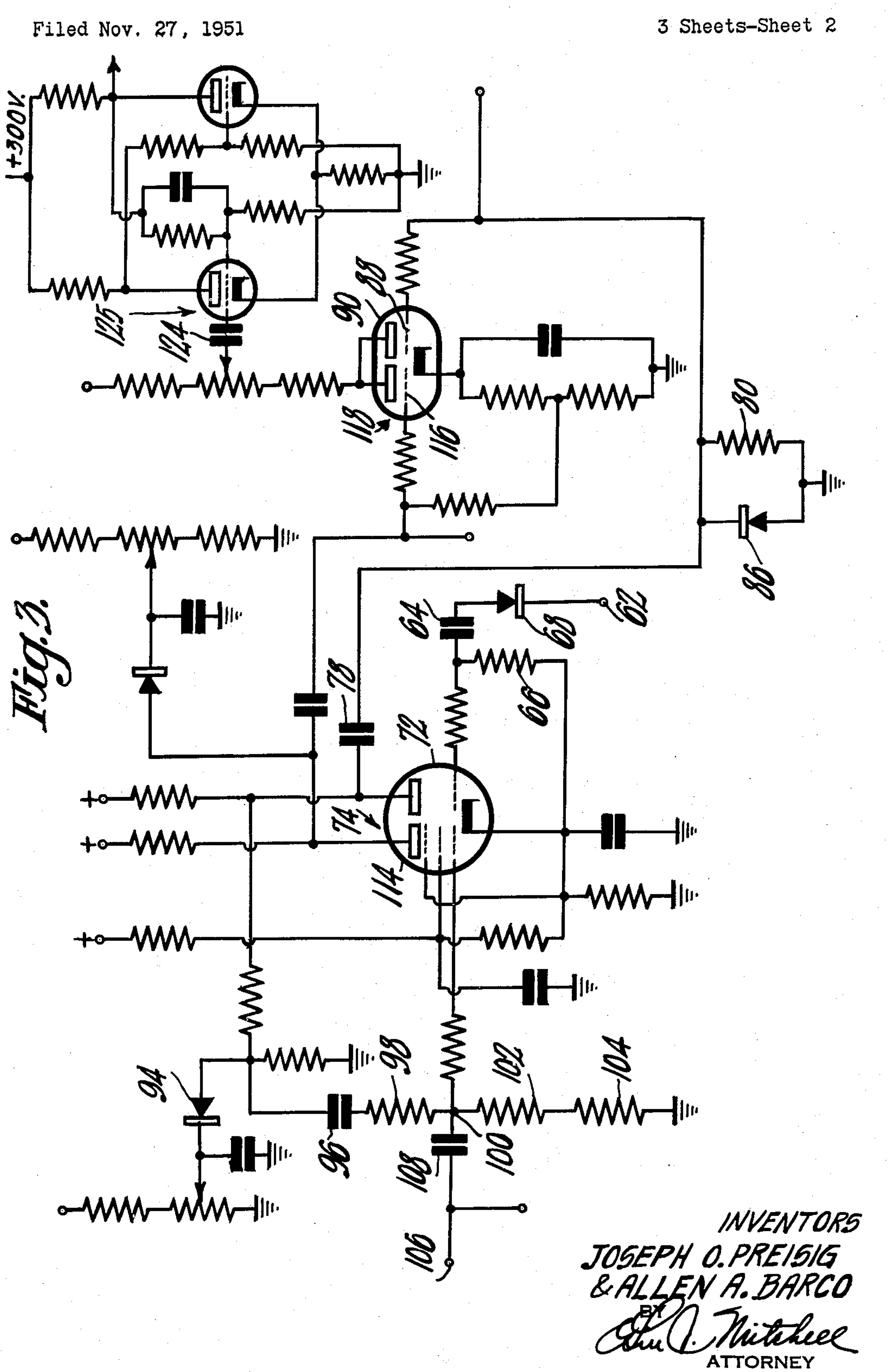
Figure 3 is a schematic diagram of another apparatus constructed in accordance with the principles of the invention.
Figure 4:
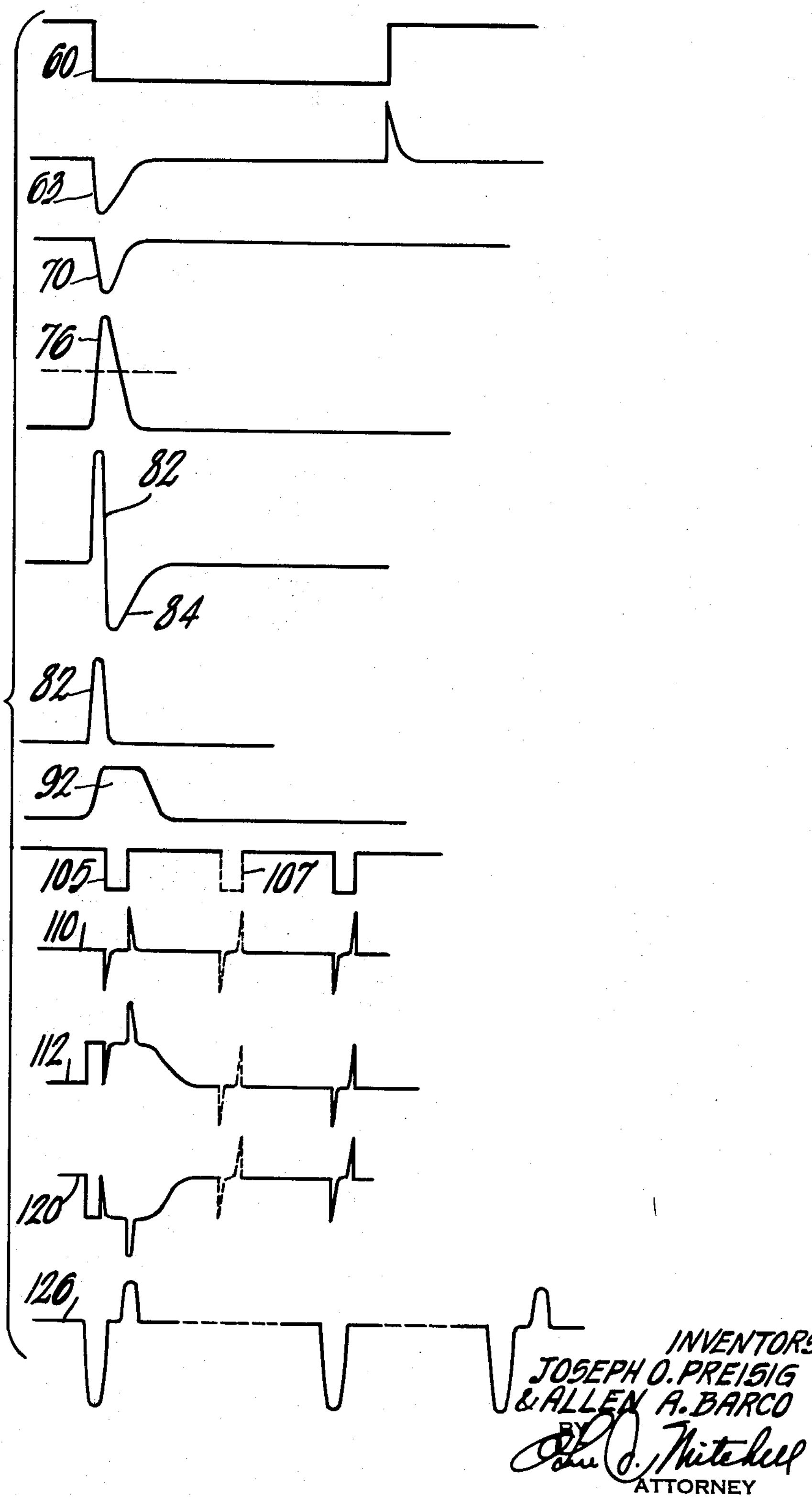
Figure 4 is a graph of various waves appearing at different points in the apparatus of Figure 3.

Another circuit for producing the required switching voltages in response to horizontal and vertical drive pulses is illustrated in Figure 3 and will now be discussed in connection with the waves shown in Figure 4. The negative vertical drive pulses 60 are applied to a terminal 62, and are differentiated by a condenser 64 and resistor 66 so as to produce a wave 63 having a negative pulse at the leading edge of the vertical drive pulse and a positive pulse at the trailing edge. The positive pulses are suppressed by the insertion of a unilateral device 68 that is polarized to present a high resistance to the discharge of the condenser 64. The time constant of the discharge circuit is sufficiently low however, to discharge the condenser 64 during a field interval.

The negative pulses 70 are the only ones applied to the right hand amplifier 72 of a tube 74. The positive pulses 76 appearing at the plate of the amplifier 72 are differentiated by a condenser 78 and a resistor 80 so as to produce positive and negative pulses 82 and 84. The negative pulse 84 is conducted to ground by a unilateral conducting device 86 and the positive pulse 82 is applied to the grid 88 of an amplifier 90. It is thus seen that the positive pulse 82 occurs in coincidence with the leading edge of each vertical drive pulse 60.

The pulses that occur on alternate blanking periods are derived as follows. The pulses 76 appearing at the plate of the amplifier 72 are clipped by a unilateral device 94 so as to form a pedestal pulse 92. The pedestal pulse 92 is coupled via condenser 96 and resistor 98 to a junction 100. The junction 100 is connected to ground via resistors 102 and 104. Negative horizontal drive pulses 105 and 107 are applied to the terminal 106 and coupled to the junction 100 by a condenser 108. The values of the condenser 108 and the resistors 102 and 104 are such as to sharply differentiate the horizontal drive pulses so as to form a wave 110. During alternate vertical blanking periods, a horizontal drive pulse 105 occurs at the same time as the pedestal 92 and therefore the pedestal pulse 92 is added to the differentiated horizontal drive pulse 105 as indicated in wave 112. It will be noted that the maximum amplitude of the pulses in the wave 112 occurs at the trailing edge of the horizontal drive pulse 105 and therefore occurs after the pulses 82 that were derived as previously discussed. The pulses of wave 112 are amplified in the left hand amplifier 114 of the tube 74 and are applied to the grid 116 of an amplifier 118. Only that portion of the pulse of the wave 112 exceeding the height of the pedestal pulse 92, or in other words only that portion exceeding the level of the dotted line 120, is permitted to reach the grid 116 because of the action of the unilateral conducting device 122. The plates of the amplifiers 90 and 118 are tied together so that the composite wave 126 appears at the output terminal 124. The negative pulses of the wave 126 are produced by the positive pulses 82 that are applied to the grid 88, and the positive pulses of wave 126 are produced in response to the maximum peaks of the wave 112. For this reason the positive pulses immediately follow a corresponding negative pulse as shown. These pulses may then be applied to one side of a bistable multivibrator 125 in such manner that the positive pulses tend to trigger it to one polarity and the negative pulses tend to trigger it to the opposite polarity.

Having described our invention, what is claimed is:

1. Field sensing apparatus for use in television systems wherein a vertical blanking period exists between successive field scanning operations, said successive field scanning operations characterized in that a difference between vertical blanking period timing and field starting timing distinguishes said scanning field, comprising in combination, means for deriving a first set of pulses during each vertical blanking interval, means utilizing said difference between vertical blanking period timing and field starting timing for deriving a second set of pulses during alternate vertical blanking intervals, said second set of pulses occurring after corresponding pulses of said first set of pulses, a bi-stable device, means for triggering said bi-stable device to one of its stable conditions in response to said first set of pulses and to its other stable condition in response to said second set of pulses, means for producing a signal in the output of said bi-stable device distinguishing the successive fields being scanned.

2. Field sensing apparatus for use in television apparatus employing successive field scanning, employing distinguishing starting time characteristics for each of the successive fields, comprising in combination, means for deriving pulses of one polarity at field rate, means for developing line rate pulses, the leading edge of said line and field rate pulses occurring simultaneously on every other field, means for deriving pulses of an opposite polarity after every other of said first field rate pulses, said pulses of opposite polarity corresponding to alternate fields and responsive to said simultaneity of leading edge occurrence, a bi-stable device, said bi-stable device coupled so as to be triggered to one stable state by pulses of one polarity and to the other stable state by pulses of an opposite polarity, and means for utilizing said bi-stable device to produce a field sensing signal indicative of the nature of the field being scanned.

3. Field sensing apparatus comprising in combination means adapted to sharply differentiate field frequency pulses, means for selecting the output pulse supplied by said differentiating means in response to the leading edge of said field frequency pulses, means for differentiating said selected pulse, means for selecting the leading pulse supplied by said latter differentiating means, means for clipping said first mentioned selected pulse so as to form a pedestal pulse, means adapted to sharply differentiate pulses of line frequency, means for adding said pedestal pulse and the sharply differentiated line frequency pulse together in such manner that the output pulse of the differentiating means in response to the trailing edge of the line frequency pulses and the pedestal pulses have the same polarity, and means for selecting the output of said adder above the level of said pedestal pulse.

4. In a television system utilizing vertical and horizontal synchronizing signals and transmitting successive fields wherein a vertical blanking period exists between said successive fields, said successive fields characterized in that the timing between the horizontal scan signals and the vertical scan signals distinguishes each of said scanning fields, field sensing apparatus comprising in combination, means for deriving a first set of pulses during each vertical blanking period, means for deriving a second set of pulses during alternate vertical blanking intervals, said means for deriving a second set of pulses responsive to the timing between the horizontal scan signals and the vertical scan signals, said second set of pulses occurring after corresponding pulses of said first set of pulses, a bi-stable device, means for triggering said bi-stable device to one of its stable conditions in response to said first set of pulses and to its other stable condition in response to said second set of pulses, and means for obtaining an identifying signal from said bi-stable device indicative of the field being scanned.

5. In a television system employing vertical and horizontal synchronizing signals and transmitting successive fields wherein a vertical blanking period exists between said successive fields, said successive fields characterized in that a difference between vertical blanking period time and the field starting time distinguishes said successive fields, field sensing apparatus comprising in combination, a means for deriving a first set of pulses during each vertical blanking period, means for deriving a second set of pulses during alternate vertical blanking periods, said second set of pulses produced by said means responsive to the timing difference between vertical blanking period time and field starting time and occurring after corresponding pulses of said first set of pulses, a bi-stable device, means for triggering said bi-stable device to one of its stable conditions in response to said first pulses, and to its other stable condition in response to said second pulses, and means for obtaining from said bi-stable device a signal identifying the successive fields.

6. In a television system utilizing vertical and horizontal synchronizing pulses and transmitting successive fields of a scanning frame, said successive fields characterized in that one of said horizontal synchronizing pulses coincides with the leading edge of the vertical synchronizing pulse in one field and with no horizontal synchronizing pulses coinciding with said leading edge of the vertical synchronizing pulse in the next field, field sensing apparatus comprising in combination, means for deriving a first set of pulses corresponding to the leading edge of each vertical synchronizing pulse, means for deriving a second set of pulses during the vertical synchronizing pulse, said means for deriving said second set of pulses responsive only to the coincidence of said horizontal scanning signal and the leading edge of said vertical scanning signal and one of said scanning fields, said second set of pulses occurring after corresponding pulses of said first set of pulses, a bi-stable device, means for triggering said bi-stable device to one of its stable conditions in response to said first set of pulses and to its other stable condition in response to said second set of pulses, and means for deriving from said bi-stable device an identifying waveform distinguishing the successive scanning fields.

7. In a television system utilizing field frequency and line frequency pulses and transmitting successive fields of a scanning frame, said successive scanning fields characterized in that in one of said successive scanning fields the leading edge of a field frequency pulse coincides with one of the line frequency pulses while in another of the successive scanning fields it does not, field sensing apparatus comprising in combination, means adapted to differentiate field frequency pulses, means for selecting the output pulse supplied by said differentiating means in response to the leading edge of said field frequency pulses, means for differentiating said selected pulses, means for selecting the leading pulse supplied by said latter differentiating means, means for clipping said first mentioned selected pulse so as to form a pedestal pulse, means adapted to sharply differentiate pulses of line frequency, means for adding said pedestal pulses and said differentiated line frequency pulse together in such manner that both the output pulse of the differentiating means in response to the trailing edge of the line frequency pulses and the pedestal pulses have the same polarity, a bi-stable device, said bi-stable device having either of two stable conditions, means for triggering said bi-stable device to one of its stable conditions in response to the output pulse of the differentiating means in response to the leading edge of the said field frequency pulses, an amplifier means, said amplifier means rendered conducting when said pedestal pulse coincides with one of the line frequency pulses, means for utilizing said amplifying means to impress the output pulse of the differentiating means in response to the trailing edge of the line frequency pulses through said amplifier means to said bi-stable device whereby said bi-stable device is triggered to its other stable condition when said pedestal pulse and said line frequency pulses coincide, and means for utilizing said bi-stable device to produce an identifying waveform, said identifying waveform utilized for distinguishing between the successive scanning fields of the scanning frame.

References Cited in the file of this patent

UNITED STATES PATENTS

| | | |
|---|---|---|
| 2,491,804 | Fleming | Dec. 20, 1949 |
| 2,515,613 | Schoenfeld | July 18, 1950 |
| 2,535,247 | White | Dec. 26, 1950 |
| 2,546,972 | Chatterjea | Apr. 3, 1951 |
| 2,570,775 | De Baun | Oct. 9, 1951 |